(12) United States Patent
Huang

(10) Patent No.: US 11,596,907 B1
(45) Date of Patent: Mar. 7, 2023

(54) APPARATUS FOR TREATING FLUIDS HAVING IMPROVED AERATION EFFICIENCY AND OPERATIONAL DURABILITY

(71) Applicant: Aeration Industries International, LLC, Chaska (MN)

(72) Inventor: Jing Huang, Chaska, MN (US)

( * ) Notice: Subject to any disclaimer, the term of this patent is extended or adjusted under 35 U.S.C. 154(b) by 325 days.

(21) Appl. No.: 16/902,158

(22) Filed: Jun. 15, 2020

Related U.S. Application Data

(60) Provisional application No. 62/861,428, filed on Jun. 14, 2019.

(51) Int. Cl.
  *B22C 5/00*   (2006.01)
  *B01F 23/233*   (2022.01)
  (Continued)

(52) U.S. Cl.
  CPC ...... *B01F 23/2331* (2022.01); *B01F 23/2333* (2022.01); *B01F 23/2334* (2022.01);
  (Continued)

(58) Field of Classification Search
  CPC ........ B01F 2101/305; B01F 2215/0422; B01F 23/2331; B01F 23/2333; B01F 23/2334;
  (Continued)

(56) References Cited

U.S. PATENT DOCUMENTS

| 10,124 A | 10/1853 | Beard |
| 26,213 A | 11/1859 | Tripp |
| (Continued) | | |

FOREIGN PATENT DOCUMENTS

| CH | 283301 A | 5/1962 |
| DE | 414890 C | 6/1925 |
| (Continued) | | |

OTHER PUBLICATIONS

Imada Y, Translated Patent Application of JP2009001212A (Year: 2009).*

(Continued)

*Primary Examiner* — Anshu Bhatia
*Assistant Examiner* — Gregory Y Huan
(74) *Attorney, Agent, or Firm* — Albert W. Watkins

(57) ABSTRACT

An apparatus for treating fluids having improved aeration efficiency and operational durability has an aerator, an impeller, and a liquid reservoir containing liquid to be treated. The aerator has: a motor rotating the impeller at a blade tip speed less than 1,100 inches/second; an air line having an outlet submerged in the liquid and an inlet adjacent to the motor; and a blower. The blower forces air through the air line to the air line outlet. The impeller two blades extending radially from the hub. Each blade has: a low drag, pressure equalized foil shape absent of rake; a leading edge extending from the hub tangentially; a 0.47-0.55 impeller EAR; 0.59-0.87 Pmean/D; progressive pitch distribution based on radius where from 50% R and out is constant and from 50% R to the hub is reduced; and 60-75 degree skew with a linear distribution from 50% radius to blade tip.

5 Claims, 5 Drawing Sheets

(51) Int. Cl.

| | | |
|---|---|---|
| *C02F 1/74* | (2023.01) | |
| *B01F 27/61* | (2022.01) | |
| *B01F 27/71* | (2022.01) | |
| *B01F 27/113* | (2022.01) | |
| C02F 103/20 | (2006.01) | |
| C02F 103/34 | (2006.01) | |
| B01F 23/237 | (2022.01) | |
| B01F 101/00 | (2022.01) | |

(52) U.S. Cl.
CPC .......... *B01F 27/1133* (2022.01); *B01F 27/61* (2022.01); *B01F 27/711* (2022.01); *C02F 1/74* (2013.01); *B01F 23/23311* (2022.01); *B01F 23/23354* (2022.01); *B01F 23/23366* (2022.01); *B01F 23/237611* (2022.01); *B01F 2101/305* (2022.01); *B01F 2215/0422* (2013.01); *C02F 2103/20* (2013.01); *C02F 2103/34* (2013.01)

(58) Field of Classification Search
CPC .......... B01F 23/23311; B01F 23/23354; B01F 23/23366; B01F 23/237611; B01F 27/1133; B01F 27/61; B01F 27/711; B01F 23/02; C02F 1/74; C02F 2103/20; C02F 2103/34
USPC ...................................... 261/77, 87
See application file for complete search history.

(56) References Cited

U.S. PATENT DOCUMENTS

| | | | |
|---|---|---|---|
| 283,592 A | 8/1883 | Folmer | |
| 368,416 A | 8/1887 | Mosher | |
| D32,885 S | 6/1900 | Rowe | |
| 683,808 A | 10/1901 | Smith | |
| 885,174 A | 4/1908 | Perkins | |
| 1,019,437 A | 3/1912 | Draper | |
| 1,082,750 A | 12/1913 | Jacomy | |
| 1,087,203 A | 2/1914 | Walters | |
| 1,107,101 A | 8/1914 | Parsons | |
| 1,108,875 A | 9/1914 | Alexander | |
| 1,343,797 A | 6/1920 | Stott et al. | |
| 1,450,326 A | 4/1923 | Maitland | |
| 1,454,542 A | 5/1923 | Grilli | |
| 1,471,590 A | 10/1923 | Carter | |
| 1,505,479 A | 8/1924 | Maitland | |
| 1,632,758 A | 6/1927 | Fulweiler et al. | |
| 1,639,828 A | 8/1927 | Wheeler et al. | |
| 1,745,412 A | 2/1930 | Fletcher | |
| 1,765,338 A | 6/1930 | Jones et al. | |
| 1,806,345 A | 5/1931 | Halvorsen | |
| 1,809,131 A | 6/1931 | Maison | |
| 1,850,476 A | 3/1932 | Riis | |
| 1,857,327 A | 5/1932 | Pilet | |
| 1,981,392 A | 11/1934 | Selman | |
| 2,047,847 A | 7/1936 | Ambjornson | |
| 2,061,564 A | 11/1936 | Drake et al. | |
| 2,063,301 A | 12/1936 | Durdin, Jr. | |
| 2,081,210 A | 5/1937 | Williams, Jr. | |
| 2,082,759 A | 6/1937 | Walker | |
| 2,116,023 A | 5/1938 | Gwidt | |
| 2,194,037 A | 3/1940 | Thuma | |
| 2,232,388 A | 2/1941 | Ingalls et al. | |
| 2,243,301 A | 5/1941 | Weinig | |
| 2,313,654 A | 3/1943 | MacLean | |
| 2,410,429 A | 11/1946 | Daman | |
| 2,433,592 A | 12/1947 | Booth | |
| 2,460,902 A | 2/1949 | Odor | |
| 2,515,538 A | 7/1950 | Wall | |
| 2,528,609 A | 11/1950 | Rouse | |
| 2,590,581 A | 3/1952 | Shirley | |
| 2,609,097 A | 9/1952 | Dering | |
| 2,641,455 A | 6/1953 | Poirot | |
| 2,767,965 A | 10/1956 | Daman | |
| 2,772,852 A | 12/1956 | Stalker | |
| 2,928,665 A | 3/1960 | Epprecht | |
| 2,944,802 A | 7/1960 | Daman | |
| 2,966,345 A | 12/1960 | Burgoon et al. | |
| 3,053,390 A | 9/1962 | Wood | |
| 3,092,678 A | 6/1963 | Braun | |
| 3,108,146 A | 10/1963 | Gross | |
| D198,001 S | 4/1964 | Mulvane | |
| 3,191,394 A | 6/1965 | Avery et al. | |
| 3,193,260 A | 7/1965 | Lamb | |
| 3,202,281 A | 8/1965 | Weston | |
| 3,210,053 A | 10/1965 | Boester | |
| 3,235,234 A | 2/1966 | Beaudoin | |
| 3,278,170 A | 10/1966 | Moritz | |
| 3,342,331 A | 9/1967 | Maxwell | |
| 3,365,178 A | 1/1968 | Bood | |
| 3,400,918 A | 9/1968 | MacLaren | |
| 3,411,706 A | 11/1968 | Woollenweber, Jr. et al. | |
| 3,497,185 A | 2/1970 | Dively | |
| 3,512,762 A | 5/1970 | Umbricht | |
| 3,572,658 A | 3/1971 | Ravitts | |
| 3,576,316 A | 4/1971 | Kaelin | |
| 3,584,840 A | 6/1971 | Fuchs | |
| 3,591,149 A | 7/1971 | Auler | |
| 3,614,072 A | 10/1971 | Brodie | |
| 3,620,512 A | 11/1971 | Muskat et al. | |
| 3,640,514 A | 2/1972 | Albritton | |
| 3,650,513 A | 3/1972 | Werner | |
| 3,669,422 A | 6/1972 | Nogaj | |
| 3,680,845 A | 8/1972 | Carlsmith et al. | |
| 3,739,912 A | 6/1973 | Miller | |
| 3,755,142 A | 8/1973 | Whipple | |
| 3,768,788 A | 10/1973 | Candel | |
| 3,775,307 A | 11/1973 | McWhirter et al. | |
| 3,776,531 A | 12/1973 | Ebner et al. | |
| 3,778,233 A * | 12/1973 | Blough | C02F 3/207 |
| | | | 261/87 |
| 3,782,702 A | 1/1974 | King | |
| 3,794,303 A | 2/1974 | Hirshon | |
| 3,797,809 A | 3/1974 | Sydnor | |
| 3,829,070 A | 8/1974 | Reba et al. | |
| 3,836,130 A | 9/1974 | Johnson et al. | |
| 3,840,457 A | 10/1974 | Wilson | |
| 3,846,292 A | 11/1974 | Le Compte, Jr. | |
| 3,893,924 A | 7/1975 | Le Compte, Jr. et al. | |
| 3,975,469 A | 8/1976 | Fuchs | |
| 3,984,323 A | 10/1976 | Evens | |
| 4,045,522 A | 8/1977 | Nafziger | |
| 4,051,035 A | 9/1977 | Boschen et al. | |
| 4,066,722 A | 1/1978 | Pietruszewski et al. | |
| 4,070,279 A | 1/1978 | Armstrong | |
| 4,073,601 A | 2/1978 | Kress | |
| 4,145,383 A | 3/1979 | Randall | |
| 4,169,047 A | 9/1979 | Wilson | |
| 4,190,619 A | 2/1980 | Cherne | |
| 4,193,951 A | 3/1980 | Stanley | |
| 4,200,597 A | 4/1980 | Baum | |
| 4,207,180 A | 6/1980 | Chang | |
| 4,216,091 A | 8/1980 | Mineau | |
| 4,230,648 A | 10/1980 | Leeuwrik | |
| 4,240,990 A | 12/1980 | Inhofer et al. | |
| 4,242,199 A | 12/1980 | Kelley | |
| 4,268,398 A | 5/1981 | Shuck et al. | |
| 4,279,753 A | 7/1981 | Nielson et al. | |
| 4,280,911 A | 7/1981 | Durda et al. | |
| 4,288,394 A | 9/1981 | Ewing et al. | |
| 4,290,979 A | 9/1981 | Sugiura | |
| 4,293,169 A | 10/1981 | Inhofer | |
| 4,308,137 A | 12/1981 | Freeman | |
| 4,308,138 A | 12/1981 | Woltman | |
| 4,308,221 A | 12/1981 | Durda | |
| 4,318,871 A | 3/1982 | Mentz | |
| 4,334,826 A | 6/1982 | Connolly et al. | |
| 4,350,589 A | 9/1982 | Stog | |
| 4,350,648 A | 9/1982 | Watkins, III et al. | |
| 4,409,100 A | 10/1983 | Rajendren | |
| 4,431,597 A | 2/1984 | Cramer et al. | |
| 4,443,338 A | 4/1984 | Reid | |

(56) References Cited

U.S. PATENT DOCUMENTS

| | | |
|---|---|---|
| 4,468,358 A | 8/1984 | Haegeman |
| 4,482,298 A | 11/1984 | Hannon et al. |
| 4,540,528 A | 9/1985 | Haegeman |
| 4,575,256 A | 3/1986 | Armitage et al. |
| 4,587,064 A | 5/1986 | Blum |
| 4,676,654 A | 6/1987 | Fleckner |
| 4,732,682 A | 3/1988 | Rymal |
| 4,734,235 A | 3/1988 | Holyoak |
| 4,741,825 A | 5/1988 | Schiller |
| 4,741,870 A | 5/1988 | Gross |
| 4,774,031 A | 9/1988 | Schurz |
| 4,789,306 A | 12/1988 | Vorus et al. |
| 4,806,251 A | 2/1989 | Durda |
| 4,818,391 A | 4/1989 | Love |
| 4,842,732 A | 6/1989 | Tharp |
| 4,844,816 A | 7/1989 | Fuchs et al. |
| 4,844,843 A | 7/1989 | Rajendren |
| 4,882,099 A | 11/1989 | Durda et al. |
| 4,909,936 A | 3/1990 | Arbisi et al. |
| 4,921,404 A | 5/1990 | Holmberg |
| 4,954,295 A | 9/1990 | Durda |
| 4,975,197 A | 12/1990 | Wittmann et al. |
| 4,997,557 A | 3/1991 | Andersen |
| 5,011,631 A | 4/1991 | Hwang |
| 5,021,154 A | 6/1991 | Haegeman |
| 5,076,929 A | 12/1991 | Fuchs et al. |
| 5,078,923 A | 1/1992 | Durda et al. |
| 5,110,510 A | 5/1992 | Norcross |
| 5,112,192 A | 5/1992 | Weetman |
| 5,116,501 A | 5/1992 | House |
| 5,122,266 A | 6/1992 | Kent |
| 5,158,434 A | 10/1992 | Weetman |
| 5,160,620 A | 11/1992 | Lygren |
| 5,160,667 A | 11/1992 | Gross et al. |
| 5,185,080 A | 2/1993 | Boyle |
| 5,209,642 A | 5/1993 | Larimer et al. |
| 5,211,847 A | 5/1993 | Kanow |
| 5,213,718 A | 5/1993 | Burgess |
| 5,223,130 A | 6/1993 | Valfrido |
| 5,249,993 A | 10/1993 | Martin |
| 5,275,722 A | 1/1994 | Beard |
| 5,275,762 A | 1/1994 | Burgess |
| 5,300,261 A | 4/1994 | Von Berg |
| 5,312,567 A | 5/1994 | Kozma et al. |
| 5,316,671 A | 5/1994 | Murphy |
| 5,326,459 A | 7/1994 | Hlavach et al. |
| 5,344,557 A | 9/1994 | Scanzillo |
| 5,354,457 A | 10/1994 | Becchi |
| 5,356,569 A | 10/1994 | Von Berg |
| 5,389,247 A | 2/1995 | Woodside |
| 5,421,999 A | 6/1995 | Poole et al. |
| 5,531,894 A | 7/1996 | Ball et al. |
| 5,545,327 A | 8/1996 | Volland |
| 5,549,455 A | 8/1996 | Speer |
| 5,554,291 A | 9/1996 | Scanzillo et al. |
| 5,582,734 A | 12/1996 | Coleman et al. |
| 5,707,562 A | 1/1998 | Karliner |
| 5,741,443 A | 4/1998 | Gemza |
| 5,744,072 A | 4/1998 | Karliner |
| 5,795,504 A | 8/1998 | Berchotteau |
| 5,807,151 A | 9/1998 | Sumino |
| D401,547 S | 11/1998 | Karliner |
| 5,846,425 A | 12/1998 | Whiteman |
| 5,851,443 A | 12/1998 | Rajendren |
| 5,861,095 A | 1/1999 | Vogel et al. |
| 5,863,435 A | 1/1999 | Heijnen et al. |
| 5,868,091 A | 2/1999 | Gross et al. |
| 5,972,212 A | 10/1999 | Hongo |
| 5,988,604 A | 11/1999 | McWhirter |
| 5,996,977 A | 12/1999 | Burgess |
| 6,022,476 A | 2/2000 | Hausin |
| 6,050,550 A | 4/2000 | Burgess |
| 6,103,123 A | 8/2000 | Gantzer |
| 6,276,670 B1 | 8/2001 | Jacobs |
| 6,325,842 B1 | 12/2001 | Caldwell et al. |
| 6,328,289 B1 | 12/2001 | Becchi |
| 6,348,147 B1 | 2/2002 | Long |
| 6,371,726 B1 * | 4/2002 | Jonsson .................. B63H 1/24 416/142 |
| 6,406,255 B1 | 6/2002 | Angelle |
| 6,514,410 B1 | 2/2003 | Gantzer |
| 6,688,849 B2 | 2/2004 | Keeton |
| 6,821,426 B1 | 11/2004 | Hausin et al. |
| 7,008,538 B2 | 3/2006 | Kasparian et al. |
| 7,172,177 B2 | 2/2007 | Durda |
| 7,465,394 B2 | 12/2008 | Durda et al. |
| 7,637,722 B1 | 12/2009 | Koepsel et al. |
| 7,678,274 B2 | 3/2010 | Durda et al. |
| 7,892,433 B2 | 2/2011 | Durda et al. |
| 8,110,108 B2 | 2/2012 | Durda et al. |
| 8,236,174 B2 | 8/2012 | Durda et al. |
| 8,277,114 B2 | 10/2012 | Higbee et al. |
| 8,328,412 B2 | 12/2012 | Higbee |
| 2007/0035045 A1 * | 2/2007 | Henley ............... B01F 23/2331 261/87 |
| 2012/0188843 A1 | 7/2012 | Hahn et al. |

FOREIGN PATENT DOCUMENTS

| | | | |
|---|---|---|---|
| FR | 375967 A | | 7/1907 |
| FR | 387820 A | | 7/1908 |
| FR | 512665 A | | 1/1921 |
| FR | 654292 A | | 4/1929 |
| FR | 808801 A | | 2/1937 |
| GB | 2532352 A | * 5/2016 | ............... C02F 1/32 |
| JP | 2009001212 A | * 1/2009 | |
| JP | 2009001212 A | | 1/2009 |
| WO | WO 2012038054 A1 | | 3/2012 |
| WO | WO 2019122464 A1 | | 6/2019 |

OTHER PUBLICATIONS

Kawakita, Chiharu. "Study on marine propeller running in bubbly flow." Proceedings of the Third International Symposium on Marine Propulsors. SMP. vol. 13. 2013. (Year: 2013).*

Yeo et al, "Computational Development of Marine Propeller Design", Journal Of Applied Sciences, 2014, 14(10), pp. 1043-1048.

"Propeller Geometry: Terms and Definitions", Michigan Wheel, Aug. 2000, 18 pgs.

* cited by examiner

APPARATUS FOR TREATING FLUIDS HAVING IMPROVED AERATION EFFICIENCY AND OPERATIONAL DURABILITY

CROSS REFERENCE TO RELATED APPLICATIONS

The present application claims the benefit of U.S. provisional patent application 62/861,428 filed Jun. 14, 2019 of like title and inventorship, the teachings and entire contents which are incorporated herein by reference.

BACKGROUND OF THE INVENTION

1. Field of the Invention

The present invention pertains generally to gas and liquid contact apparatus, and more particularly to such apparatus using a rotating impeller to deliver a gas at a submerged location. In another manifestation, the present invention pertains generally to an aeration apparatus for treating a fluid using a submerged impeller.

2. Description of the Related Art

Aeration apparatuses introduce air into a liquid. While most applications depend upon dissolving at least a portion of the oxygen contained in the air into the liquid, there are at least some applications where simple introduction and mixing of the air is the important objective. For yet other applications, a gas other than air may be introduced to meet a particular need or desire. For the purposes of the present disclosure, references to air herein will be understood to include other gases that may be required or desired for particular applications, though air will also be understood to be the most common and also most preferred. In some applications, the aeration apparatus must alternate between introducing air into the liquid while mixing the liquid and mixing the liquid without introducing air.

The liquid being treated often, for exemplary purposes only and not limiting the present invention thereto, will be contained in one or more ponds, lakes, wastewater lagoons, or various ones of other liquid holding tanks or reservoirs. Municipal sewage treatment, industrial and commercial processing liquid and wastewater treatment, and aquiculture are illustrative of a few of the many applications for modern aeration apparatuses.

Most commonly in wastewater processing, and often independent of whether from municipal or industrial sources, increased oxygen content of the wastewater increases the activity of aerobic bacteria. These bacteria help to clean and purify the wastewater before it is treated using other means, or released into the ecosystem such as through a river. In the case of aquiculture, increased oxygen content can support increased production of plant and animal species.

One common way to increase oxygen content is to provide an aeration unit mounted to a stationary or at least floating object. The aeration unit will typically include a motor driving an impeller. As the impeller turns, air is actively or passively mixed into the turbulent water. For most applications, several horsepower may be required for adequate aeration. For larger commercial applications, there may be a plurality of aeration units provided at different locations about a lagoon or reservoir.

To the untrained eye, various aeration and mixing impellers used to mix or otherwise move water about may appear to be visually indistinguishable from marine helical propellers commonly used for boats and other watercraft. In fact, many early aeration impellers were selected from marine helical propellers. As a result, aeration impellers can in some cases be quite similar in basic visual appearance and design to propellers. Both impellers and propellers are produced in a variety of different designs, depending on the intended application. However, to those more familiar with propellers and impellers, very subtle variations in the impeller or propeller shape can very substantially alter performance and suitability for an intended use.

Propellers are most commonly affixed to and supported by a moving watercraft, and are designed to optimize locomotion of that watercraft. Boats and personal watercraft are meant to move people across the water quickly, and so are designed to travel at high speed in the water. As a result, the propeller is moving forward in the water at substantial speed. When the boat reaches optimal speed, the propeller most ideally will be thought of as passing through the water in a helical or corkscrew pattern. Ideally, the water would barely move at all. Instead, movement of the water relative to surrounding water represents waste or inefficiency, since water-to-water movement represents significant loss to the intended propulsion. Think of the difference between walking on pavement, where there is no movement of the ground beneath your feet, and walking on a dry sandy beach or sand dune, where the sand slides under your feet. Movement of the sand makes it considerably more difficult to walk. Consequently, for a propeller, thrust is desired and fluid displacement is an undesired consequence.

In contrast, impellers are usually stationary. The impellers are preferably optimized to move a liquid best suited to accomplish a particular task, such as mixing or pumping the liquid. As may be readily pictured, a mixer most desirably generates movement of water relative to surrounding water, so that the water is well mixed. As a result, mixing impellers are designed to most efficiently stir and move water relative to surrounding water, and so have a near-opposite set of design parameters to those desired for a propeller.

Even impellers designed to pump a liquid have their own unique designs. Many pump-type impellers are provided with a shroud or housing, and movement of the impeller within the confines of the housing forces the liquid to travel from an inlet into the housing to an outlet of the housing, and often from there through a pipe or further similar conduit, shroud, or housing.

In aeration applications, the impeller is designed for efficient aeration and mixing, with no concern for propulsion, since the aeration apparatus is usually fixed or anchored within the pond or lagoon. Since the aeration impeller is fixed, and the lagoon is generally quite large relative to the aeration apparatus, the relative speed of incoming water to the impeller is very low, near zero.

In the field of aeration, and further confounding the challenges a designer faces, different bodies of water, such as different municipal water treatment basins, will have differing levels of debris contained therein. In containment areas that are not pre-filtered, debris such as plastic bags, strings or other matter often wrap around or cover the blades of impellers, decreasing aeration efficiency and potentially causing damage to the aeration apparatus.

Aeration apparatuses are a part of an industry that has been well-developed over the last four decades, with many advances made both by the present assignee and by others in the industry.

Exemplary US patents owned by the present assignee, the teachings and contents which are incorporated herein by reference, include: U.S. Pat. No. 4,240,990 by Inhofer et al, entitled "Aeration propeller and apparatus"; U.S. Pat. No. 4,280,911 by Durda et al, entitled "Method for treating water"; U.S. Pat. No. 4,293,169 by Inhofer, entitled "Water bearing"; U.S. Pat. No. 4,308,221 by Durda, entitled "Apparatus for mixing a gas and a liquid"; U.S. Pat. No. 4,409,100 by Rajendren, entitled "Liquid aerating device"; U.S. Pat. No. 4,741,825 by Schiller, entitled "Mobile vortex shield"; U.S. Pat. No. 4,774,031 by Schurz, entitled "Aerator"; U.S. Pat. No. 4,806,251 by Durda, entitled "Oscillating propeller type aerator apparatus and method"; U.S. Pat. No. 4,882,099 by Durda et al, entitled "Aeration apparatus having a deicing mechanism and control circuit therefor"; U.S. Pat. No. 4,954,295 by Durda, entitled "Propeller aerator with peripheral injection of fluid and method of using the aerator"; U.S. Pat. No. 5,078,923 by Durda et al, entitled "Aeration apparatus having a deicing mechanism and control circuit therefor"; U.S. Pat. No. 5,707,562 by Karliner, entitled "Turbo aerator"; U.S. Pat. No. 5,744,072 by Karliner, entitled "Method of treating waste water"; U.S. Pat. No. 7,172,177 by Durda, entitled "Aerator"; U.S. Pat. No. 7,465,394 by Durda et al, entitled "Wastewater treatment system"; U.S. Pat. No. 7,678,274 by Durda et al, entitled "Wastewater treatment system"; U.S. Pat. No. 7,892,433 by Durda et al, entitled "Wastewater treatment system"; U.S. Pat. No. 8,110,108 by Durda et al, entitled "Wastewater treatment system"; U.S. Pat. No. 8,236,174 by Durda et al, entitled "Wastewater treatment system"; and Des U.S. Pat. No. 401,547 by Karliner, entitled "Aerator float".

Other exemplary US patents of varying relevance to aeration, the teachings and contents of each which are incorporated herein by reference, include: U.S. Pat. No. 1,343,797 by Stott et al, entitled "Aeration of sewage and other impure liquids"; U.S. Pat. No. 1,450,326 by Maitland, entitled "Apparatus for treating oils"; U.S. Pat. No. 1,505,479 by Maitland, entitled "Apparatus for treating oils"; U.S. Pat. No. 1,632,758 by Fulweiler et al, entitled "Process of purifying gas"; U.S. Pat. No. 1,639,828 by Wheeler et al, entitled "Process for treating cheese"; U.S. Pat. No. 1,745,412 by Fletcher, entitled "Aerator"; U.S. Pat. No. 1,765,338 by Jones et al, entitled "Agitator, aerator, and mixer"; U.S. Pat. No. 2,061,564 by Drake et al, entitled "Diffusion impeller deflector"; U.S. Pat. No. 2,063,301 by Durdin, Jr., entitled "Aerator"; U.S. Pat. No. 2,082,759 by Walker, entitled "Method and apparatus for treatment of sewage"; U.S. Pat. No. 2,116,023 by Gwidt, entitled "Aerator"; U.S. Pat. No. 2,194,037 by Thuma, entitled "Aerating device for liquids"; U.S. Pat. No. 2,232,388 by Ingalls et al, entitled "Froth flotation apparatus"; U.S. Pat. No. 2,243,301 by Weinig, entitled "Aeration apparatus"; U.S. Pat. No. 2,313,654 by MacLean, entitled "Apparatus for treating liquids with gases"; U.S. Pat. No. 2,410,429 by Daman, entitled "Agitation and aeration apparatus"; U.S. Pat. No. 2,433,592 by Booth, entitled "Aeration method and machine"; U.S. Pat. No. 2,515,538 by Wall, entitled "Water aerator, filter, and heater"; U.S. Pat. No. 2,590,581 by Shirley, entitled "Device for aerating water"; U.S. Pat. No. 2,609,097 by Dering, entitled "Flotation machine"; U.S. Pat. No. 2,641,455 byPoirot, entitled "Device which aerates water"; U.S. Pat. No. 2,767,965 byDaman, entitled "Dual pumping agitation"; U.S. Pat. No. 2,928,665 by Epprecht, entitled "Gas-liquid mixing apparatus"; U.S. Pat. No. 2,944,802 by Daman, entitled "Froth flotation and aeration apparatus"; U.S. Pat. No. 2,966,345 by Burgoon et al, entitled "Mixing apparatus"; U.S. Pat. No. 3,053,390 by Wood, entitled "Sewage treating apparatus"; U.S. Pat. No. 3,092,678 by Braun, entitled "Apparatus for gasifying liquids"; U.S. Pat. No. 3,108,146 by Gross, entitled "Fluid handling device"; U.S. Pat. No. 3,191,394 by Avery et al, entitled "Conservation arrangement and method"; U.S. Pat. No. 3,193,260 by Lamb, entitled "Apparatus for aerating and eliminating ice on water"; U.S. Pat. No. 3,202,281 by Weston, entitled "Method for the flotation of finely divided minerals"; U.S. Pat. No. 3,210,053 by Boester, entitled "Aerator structure"; U.S. Pat. No. 3,235,234 by Beaudoin, entitled "Apparatus for aerating water"; U.S. Pat. No. 3,278,170 by Moritz, entitled "Apparatus for placing gases and liquids into intimate contact"; U.S. Pat. No. 3,342,331 by Maxwell, entitled "Flotation machine"; U.S. Pat. No. 3,365,178 by Bood, entitled "Apparatus for agitating and aerating exposed bodies of water"; U.S. Pat. No. 3,400,918 by MacLaren, entitled "Sewage aerator"; U.S. Pat. No. 3,411,706 by Woollenweber, Jr. et al, entitled "Bearing durability enhancement device for turbocharger"; U.S. Pat. No. 3,497,185 by Dively, entitled "Aerating and cooling apparatus"; U.S. Pat. No. 3,512,762 by Umbricht, entitled "Apparatus for liquid aeration"; U.S. Pat. No. 3,572,658 by Ravitts, entitled "Floating aerator"; U.S. Pat. No. 3,576,316 by Kaelin, entitled "Apparatus for surface aeration and circulation of liquid"; U.S. Pat. No. 3,584,840 by Fuchs, entitled "Mixing device for introducing additives into a liquid"; U.S. Pat. No. 3,591,149 by Auler, entitled "Aeration apparatus"; U.S. Pat. No. 3,614,072 by Brodie, entitled "Hydraulic flow inducer"; U.S. Pat. No. 3,620,512 by Muskat et al, entitled "Aerating apparatus"; U.S. Pat. No. 3,640,514 by Albritton, entitled "Aeration"; U.S. Pat. No. 3,650,513 by Werner, entitled "Aeration device"; U.S. Pat. No. 3,669,422 by Nogaj, entitled "Aeration apparatus"; U.S. Pat. No. 3,680,845 by Carlsmith et al, entitled "Aerating apparatus and method"; U.S. Pat. No. 3,739,912 by Miller, entitled "Screening and aerating concentrator"; U.S. Pat. No. 3,755,142 by Whipple, entitled "Process and apparatus for the purification of a natural body of water"; U.S. Pat. No. 3,768,788 by Candel, entitled "Liquid aeration method and apparatus"; U.S. Pat. No. 3,775,307 by McWhirter et al, entitled "System for gas sparging into liquid"; U.S. Pat. No. 3,776,531 by Ebner et al, entitled "Apparatus and propeller for entraining fluids in liquids"; U.S. Pat. No. 3,778,233 by Blough et al, entitled "Apparatus for liquid composting"; U.S. Pat. No. 3,782,702 by King, entitled "Apparatus for mixing and treating fluids"; U.S. Pat. No. 3,794,303 by Hirshon, entitled "Method and apparatus for aerating bodies of water"; U.S. Pat. No. 3,797,809 by Sydnor, entitled "Aerator apparatus"; U.S. Pat. No. 3,829,070 by Imants et al, entitled "Gasification system"; U.S. Pat. No. 3,836,130 by Johnson et al, entitled "Liquid aerating apparatus"; U.S. Pat. No. 3,840,457 by Wilson, entitled "Method and apparatus for treating animal waste"; U.S. Pat. No. 3,846,292 by Le Compte, Jr., entitled "Ejector aerated oxidation ditch for waste treatment"; U.S. Pat. No. 3,893,924 by Le Compte, Jr. et al, entitled "Aerobic lagoon waste treatment system and method"; U.S. Pat. No. 3,975,469 by Fuchs, entitled "Device for revolving liquids and supplying gas thereto"; U.S. Pat. No. 3,984,323 by Evens, entitled "Apparatus for purifying polluted water"; U.S. Pat. No. 4,045,522 by Nafziger, entitled "Animal waste treatment system"; U.S. Pat. No. 4,051,035 by Boschen et al, entitled "Apparatus for the aerobic treatment of liquid waste"; U.S. Pat. No. 4,066,722 by Pietruszewski et al, entitled "Apparatus for sparging gas into liquid"; U.S. Pat. No. 4,070,279 by Armstrong, entitled "Eductor for dissolving gases in liquids"; U.S. Pat. No. 4,145,383 by Randall, entitled "Slurry aeration method and apparatus"; U.S. Pat.

No. 4,169,047 by Wilson, entitled "Flotation machine with mixing and aeration impeller and method"; U.S. Pat. No. 4,190,619 by Cherne, entitled "Liquid aerating rotor assembly"; U.S. Pat. No. 4,193,951 by Stanley, entitled "Water aerating device"; U.S. Pat. No. 4,207,180 by Chang, entitled "Gas-liquid reaction method and apparatus"; U.S. Pat. No. 4,216,091 by Mineau, entitled "Water aerator"; U.S. Pat. No. 4,242,199 by Kelley, entitled "Aerator apparatus"; U.S. Pat. No. 4,268,398 by Shuck et al, entitled "Sludge agitating method"; U.S. Pat. No. 4,279,753 by Nielson et al, entitled "Wastewater treatment system including multiple stages of alternate aerobic-anerobic bioreactors in series"; U.S. Pat. No. 4,288,394 by Ewing et al, entitled "Sewage aeration system"; U.S. Pat. No. 4,290,979 by Sugiura, entitled "Aeration apparatus"; U.S. Pat. No. 4,308,137 by Freeman, entitled "Water aeration and circulation apparatus"; U.S. Pat. No. 4,308,138 by Woltman, entitled "Treating means for bodies of water"; U.S. Pat. No. 4,318,871 by Mentz, entitled "Mounting ring construction for surface aerator apparatus"; U.S. Pat. No. 4,334,826 by Connolly et al, entitled "Surface aerator impeller"; U.S. Pat. No. 4,350,589 by Stog, entitled "Floating jet aerator"; U.S. Pat. No. 4,350,648 by Watkins III et al, entitled "Floating aerator"; U.S. Pat. No. 4,431,597 by Cramer et al, entitled "Horizontal mixing aerator"; U.S. Pat. No. 4,443,338 by Reid, entitled "Conversion of plug flow and complete mix aeration basins to barrier oxidation ditches"; U.S. Pat. No. 4,468,358 by Haegeman, entitled "Apparatus for mixing air and liquid"; U.S. Pat. No. 4,540,528 by Haegeman, entitled "Apparatus for mixing gas and liquid"; U.S. Pat. No. 4,587,064 by Blum, entitled "Aeration apparatus for large waters"; U.S. Pat. No. 4,676,654 by Fleckner, entitled "Agitator device"; U.S. Pat. No. 4,732,682 by Rymal, entitled "Aeration apparatus and method"; U.S. Pat. No. 4,734,235 by Holyoak, entitled "Aerator"; U.S. Pat. No. 4,741,870 by Gross, entitled "Apparatus for treatment of liquids"; U.S. Pat. No. 4,818,391 by Love, entitled "Integral Clarifier"; U.S. Pat. No. 4,842,732 by Tharp, entitled "Apparatus for aerating and mixing waste water"; U.S. Pat. No. 4,844,816 by Fuchs et al, entitled "Method of aeration at specific depth and pressure conditions"; U.S. Pat. No. 4,844,843 by Rajendren, entitled "Waste water aerator having rotating compression blades"; U.S. Pat. No. 4,909,936 by Arbisi et al, entitled "Water aerating system"; U.S. Pat. No. 4,975,197 by Wittmann et al, entitled "Orbal wastewater treatment process"; U.S. Pat. No. 4,997,557 by Andersen, entitled "Floating, mixing, aerating and decanting unit"; U.S. Pat. No. 5,011,631 by Hwang, entitled "Turbo-jet aerator"; U.S. Pat. No. 5,021,154 by Haegeman, entitled "Mixer/aerator for waste water"; U.S. Pat. No. 5,076,929 by Fuchs et al, entitled "Sewage lagoon system"; U.S. Pat. No. 5,110,510 by Norcross, entitled "Aeration and mixing apparatus"; U.S. Pat. No. 5,116,501 by House, entitled "Paddlewheel aerator drive mechanism"; U.S. Pat. No. 5,122,266 by Kent, entitled "Apparatus for advanced aquaculture life support"; U.S. Pat. No. 5,160,620 by Lygren, entitled "Method and apparatus for treating water"; U.S. Pat. No. 5,160,667 by Gross et al, entitled "Bearing protection device for liquid aerators"; U.S. Pat. No. 5,185,080 by Boyle, entitled "Process for the on-site removal of nitrates from wastewater"; U.S. Pat. No. 5,211,847 by Kanow, entitled "Denitrification methods"; U.S. Pat. No. 5,213,718 by Burgess, entitled "Aerator and conversion methods"; U.S. Pat. No. 5,223,130 by Valfrido, entitled "Device for organic neutralization and removal of phosphorus compounds present in water basins"; U.S. Pat. No. 5,275,722 by Beard, entitled "Oxidation ditch wastewater treatment and denitrification system"; U.S. Pat. No. 5,275,762 by Burgess, entitled "Aerator"; U.S. Pat. No. 5,300,261 by Von Berg, entitled "Liquid aerating apparatus"; U.S. Pat. No. 5,312,567 by Kozma et al, entitled "Complex mixer for dispersion of gases in liquid"; U.S. Pat. No. 5,316,671 by Murphy, entitled "Submersible aeration train and aeration apparatus for biological purification of sewage"; U.S. Pat. No. 5,326,459 by Hlavach et al, entitled "Wastewater treatment apparatus"; U.S. Pat. No. 5,344,557 by Scanzillo, entitled "Incubator for biological cleaning of fluids"; U.S. Pat. No. 5,354,457 by Becchi, entitled "Water treatment equipment"; U.S. Pat. No. 5,356,569 by Von Berg, entitled "Liquid aerating apparatus"; U.S. Pat. No. 5,389,247 by Woodside, entitled "Waste water treatment process"; U.S. Pat. No. 5,421,999 by Poole et al, entitled "Floating nitrification reactor in a treatment pond"; U.S. Pat. No. 5,531,894 by Ball et al, entitled "Method of treating wastewater"; U.S. Pat. No. 5,545,327 by Volland, entitled "Wastewater treatment method and apparatus"; U.S. Pat. No. 5,554,291 by Scanzillo et al, entitled "Methods and apparatus for biodegradation of polluted fluids"; U.S. Pat. No. 5,582,734 by Coleman et al, entitled "Oxidation ditch modification and automated control system for nitrogen removal and sludge settling improvements"; U.S. Pat. No. 5,741,443 by Gemza, entitled "Oxygenation of stratified water"; U.S. Pat. No. 5,795,504 by Berchotteau, entitled "Apparatus for feeding and diffusing air or another gas into a liquid"; U.S. Pat. No. 5,846,425 by Whiteman, entitled "Methods for treatment of waste streams"; U.S. Pat. No. 5,851,443 by Rajendren, entitled "Aerator with dual path discharge"; U.S. Pat. No. 5,861,095 by Vogel et al, entitled "Method and device for treating wastewater"; U.S. Pat. No. 5,863,435 by Heijnen et al, entitled "Biological treatment of wastewater"; U.S. Pat. No. 5,868,091 by Gross et al, entitled "Float mounted aerator having a work deck"; U.S. Pat. No. 5,972,212 by Hongo, entitled "Apparatus for treating organic waste water utilizing microorganisms"; U.S. Pat. No. 5,988,604 by McWhirter, entitled "Mixing impellers especially adapted for use in surface aeration"; U.S. Pat. No. 5,996,977 by Burgess, entitled "Temperature adjusted water aerator and circulation system"; U.S. Pat. No. 6,022,476 by Hausin, entitled "Water treatment process"; U.S. Pat. No. 6,050,550 by Burgess, entitled "Apparatus for aeration and bottom agitation for aqua-culture systems"; U.S. Pat. No. 6,103,123 by Gantzer, entitled "Aeration device and method for creating and maintaining facultative lagoon"; 6,276,670 by Jacobs, entitled "Combined mixer-aerator"; U.S. Pat. No. 6,325,842 by Caldwell et al, entitled "Method and apparatus for aerating"; U.S. Pat. No. 6,328,289 by Becchi, entitled "Device for treating water in a basin"; U.S. Pat. No. 6,348,147 by Long, entitled "Fluid flow system for floating biological contactor"; U.S. Pat. No. 6,514,410 by Gantzer, entitled "Odor control apparatus for facultative lagoon"; U.S. Pat. No. 6,821,426 by Hausin et al, entitled "Process for treating a body of water"; and U.S. Pat. No. 7,008,538 by Kasparian et al, entitled "Single vessel multi-zone wastewater bio-treatment system".

Impellers and propellers can be characterized by a number of geometrical features that have provided a way to numerically specify their design. Commonly specified impeller or propeller characteristics include: diameter; the number of blades; direction of rotation; and the EAR (Expanded Area Ratio), PAR (Projected Area Ratio), or BAR (Blade Area Ratio). Commonly specified blade characteristics include: skew; rake; pitch and pitch distribution; thickness; and expanded sections. These and many other characteristics are set forth in "Propeller Geometry: Terms and Definitions" by Michigan Wheel dated August 2000, which is incorporated herein by reference in entirety for the definitions of words and terms specific to the impeller and propeller arts. In addition thereto, an article from the Journal Of Applied Sciences, 2014 14(10):1043-1048 by Yeo et al, entitled "Computational Development of Marine Propeller Design" is also incorporated herein by reference for the teachings of the affects of changing various ones of these features, as well as the general design knowledge and other teachings and contents found therein.

U.S. and foreign patents and published applications that illustrate a high BAR-EAR, the teachings and contents which are incorporated by reference, include: U.S. Pat. No. 1,107,101 by Parsons, entitled "Propeller"; U.S. Pat. No. 1,454,542 by Grilli, entitled "Screw propeller"; U.S. Pat. No. 1,809,131 by Maison, entitled "Propeller"; U.S. Pat. No. 4,921,404 by Holmberg, entitled "Propellors for watercraft"; FR512665 by Maublanc et al, entitled "High performance propeller"; and FR654292 by Scaglia et al, entitled "Improvements to propeller drives".

U.S. and foreign patents and published applications that illustrate a high amount of skew, the teachings and contents which are incorporated by reference, include: U.S. Pat. No. 26,213 by Tripp, entitled "Screw propeller"; U.S. Pat. No. 368,416 by Mosher, entitled "Screw propeller"; U.S. Pat. No. 885,174 by Perkins, entitled "Propeller Wheel"; U.S. Pat. No. 1,087,203 by Walters, entitled "Propeller"; U.S. Pat. No. 1,806,345 by Halvorsen, entitled "Screw propeller"; U.S. Pat. No. 2,081,210 by Williams, entitled "Rotary propeller"; DE414890 by Quitt, entitled "Propeller"; FR375967 by Beedle, entitled "Improvements in propeller drives for ships and their equivalent"; and FR387820 by Flindt, entitled "Improvements to propeller drives for ships".

U.S. and foreign patents and published applications that illustrate a hydrofoil geometry, the teachings and contents which are incorporated by reference, include: U.S. Pat. No. 1,082,750 by Jacomy, entitled "Metallic Propeller"; U.S. Pat. No. 1,108,875 by Alexander, entitled "Propeller"; U.S. Pat. No. 1,471,590 by Carter, entitled "Propeller"; U.S. Pat. No. 1,850,476 by Riis, entitled "Propeller"; U.S. Pat. No. 1,981,392 by Selman, entitled "Propeller and the like"; U.S. Pat. No. 4,073,601 by Kress, entitled "Marine propeller"; U.S. Pat. No. 5,112,192 by Weetman, entitled "Mixing impellers and impeller systems for mixing and blending liquids and liquid suspensions having a wide range of viscosities"; U.S. Pat. No. 5,158,434 by Weetman, entitled "Mixing impellers and impeller systems for mixing and blending liquids and liquid suspensions having a wide range of viscosities"; U.S. Pat. No. 6,688,849 by Keeton, entitled "Impeller and propeller"; and WO2012038054 by Rohn, entitled "Stirring blade and stirring device".

A few patents illustrate some various combinations of characteristics found in the present invention. Exemplary U.S. patents, the teachings which are incorporated herein by reference, include: U.S. Pat. No. 1,857,327 by Pilet, entitled "Propeller"; U.S. Pat. No. 2,528,609 by Rouse, entitled "Propeller"; U.S. Pat. No. 4,482,298 by Hannon et al, entitled "Weedless propeller"; U.S. Pat. No. 4,789,306 by Vorus et al, entitled "Marine propeller"; U.S. Pat. No. 5,249,993 by Martin, entitled "Weed resistant boat propeller"; U.S. Pat. No. 5,549,455 by Speer, entitled "Through the hub exhaust flow improvements for marine variable pitch propeller"; U.S. Pat. No. 7,637,722 by Koepsel et al, entitled "Marine propeller"; U.S. Pat. No. 8,328,412 by Higbee, entitled "Combined axial-radial intake impeller with circular rake"; and Des 198,001 by Mulvane, entitled "Propeller".

Additional exemplary U.S. and Foreign patents and published applications of varying relevance, the relevant teachings and contents which are incorporated herein by reference, include: U.S. Pat. No. 10,124 by Beard, entitled "Screw propeller"; U.S. Pat. No. 283,592 by Folmer, entitled "Screw propeller"; U.S. Pat. No. 683,808 by Smith, entitled "Screw propeller blade"; 1,019,437 by Draper, entitled "Screw Propeller"; U.S. Pat. No. 2,047,847 by Ambjornson, entitled "Propeller"; U.S. Pat. No. 2,460,902 by Odor, entitled "Propeller"; U.S. Pat. No. 2,772,852 by Stalker, entitled "Rotor construction for fluid machines"; U.S. Pat. No. 4,200,597 by Baum, entitled "Device for revolving liquids and supplying gas thereto"; U.S. Pat. No. 4,230,648 by Leeuwrik, entitled "Rotor adapted to rotate about a rotary shaft"; U.S. Pat. No. 4,575,256 by Armitage et al, entitled "Ragless propeller draft tube mixer"; U.S. Pat. No. 5,209,642 by Larimer et al, entitled "Modified optimum pitch propeller"; U.S. Pat. No. 5,807,151 by Sumino, entitled "Propeller for marine propulsion drive"; U.S. Pat. No. 6,406,255 by Angelle, entitled "Apparatus and method for handling waste C-I-P II"; U.S. Pat. No. 8,277,114 by Higbee et al, entitled "Gas foil impeller"; 2012/0188843 by Hahn et al, entitled "Axially operating stirring element manufactures from sheet metal"; Des 32,885 by Rowe, entitled "Propeller"; CH283301A by Hauser, entitled "Drive device, especially on ships"; FR808801A by Marlet, entitled "New propeller for high-speed liners and for planes and aircraft"; JP2009001212 by Imada et al, entitled "Ship propulsion device and design method of ship propulsion device"; and WO2019122464 by Romero Vazquez, entitled "Accelerating ducted propeller system for propelling boats".

In addition to the foregoing patents, Webster's New Universal Unabridged Dictionary, Second Edition copyright 1983, is incorporated herein by reference in entirety for the definitions of more general words and terms used herein.

As may be appreciated from the foregoing, a designer of a propeller or impeller is faced with a nearly infinite number of choices of features and variables that may be adjusted and varied to change performance characteristics. While computational systems provide improved modeling of a design, and so can assist with fine tuning thereof, much uncertainty remains about performance until the impeller or propeller is powered and tested in an intended application. Even with fluid modeling, the design of these propellers and impellers remains much more of an art than a science.

As may be appreciated then, in spite of the enormous advancements and substantial research and development that has been conducted over the years regarding various propeller and impeller designs and geometries, there still remains a need for an improved aeration impeller that expands the range of waste water applications for which an aeration unit may be used while decreasing the likelihood of impeller obstructions and malfunctions, all while maintaining a higher level of performance, including but not limited to optimum mixing and oxygen transfer efficiency.

SUMMARY OF THE INVENTION

In a first manifestation, the invention is, in combination, a blower-assisted aerator, an impeller, and a liquid reservoir containing a liquid. The blower-assisted aerator has: an eight-pole electric motor rotating the impeller fully submerged within the liquid at a blade tip speed less than 1,100 inches per second; an air line having an air line outlet submerged in the liquid and distal to the motor and an air line inlet relatively more adjacent to the motor than the air line outlet; and a blower having a blower air inlet and an air outlet, the blower forcing air from the blower inlet into the air line inlet and through the air line to the air line outlet. The impeller has: a hub coupled to the electric motor and defining an axis of rotation; and two blades extending radially from the hub, each one of the two blades having a low drag, pressure equalized foil shape absent of rake, a leading edge extending from the hub tangentially, an impeller EAR between 0.47 and 0.55, Pmean/D between 0.59 and 0.87, progressive pitch distribution based on radius where from 50% radius and out is constant and from 50% radius to the hub is reduced, and a skew of between 60 and 75 degrees with a linear distribution from about the 50% radius to a blade tip.

In a second manifestation, the invention is, in combination, a blower-assisted aerator, an impeller, and a liquid reservoir containing a liquid. The blower-assisted aerator has: a motor rotating the impeller fully submerged within the liquid at a blade tip speed less than 1,100 inches per second; an air line having an air line outlet submerged in the liquid and distal to the motor and an air line inlet external to the liquid and relatively more adjacent to the motor than the air line outlet; and a blower having a blower air inlet and an air outlet, the blower forcing air from the blower inlet into the air line inlet and through the air line to the air line outlet. The impeller has: a hub coupled to the motor that defines an axis of rotation; and two blades extending radially from the hub, each one of the two blades absent of rake, having a leading edge extending from the hub tangentially, and having a skew of between 50 and 100 degrees.

In a third manifestation, the invention is, in combination, an aspirator aerator, an impeller, and a liquid reservoir containing a liquid. The aspirator aerator has: a motor rotating the impeller fully submerged within the liquid at a blade tip speed less than 1,100 inches per second; and an air line having an air line outlet submerged in the liquid and distal to the motor and an air line inlet external to the liquid and relatively more adjacent to the motor than the air line outlet. The impeller has: a hub coupled to the motor that defines an axis of rotation; and two blades extending radially from the hub, each one of the two blades absent of rake, having a leading edge extending from the hub tangentially, and having a skew of between 50 and 100 degrees.

OBJECTS OF THE INVENTION

Exemplary embodiments of the present invention solve inadequacies of the prior art by providing a low-RPM motor turning a highly skewed but unraked two blade propeller with a blade root emanating approximately tangentially from the hub.

The present invention and the preferred and alternative embodiments have been developed with a number of objectives in mind. While not all of these objectives are found in every embodiment, these objectives nevertheless provide a sense of the general intent and the many possible benefits that are available from embodiments of the present invention.

A first object of the invention is to provide an anti-fouling impeller for an aeration unit that is easily installed and maintained. A second object of the invention is to expand the range of waste water applications for which an aeration unit may be used. Another object of the present invention is to decrease impeller obstructions and malfunctions. A further object of the invention is to maintain a higher level of performance, including but not limited to optimum mixing and oxygen transfer efficiency. Yet another object of the present invention is to reduce required maintenance and replacement part costs.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Figure 1:
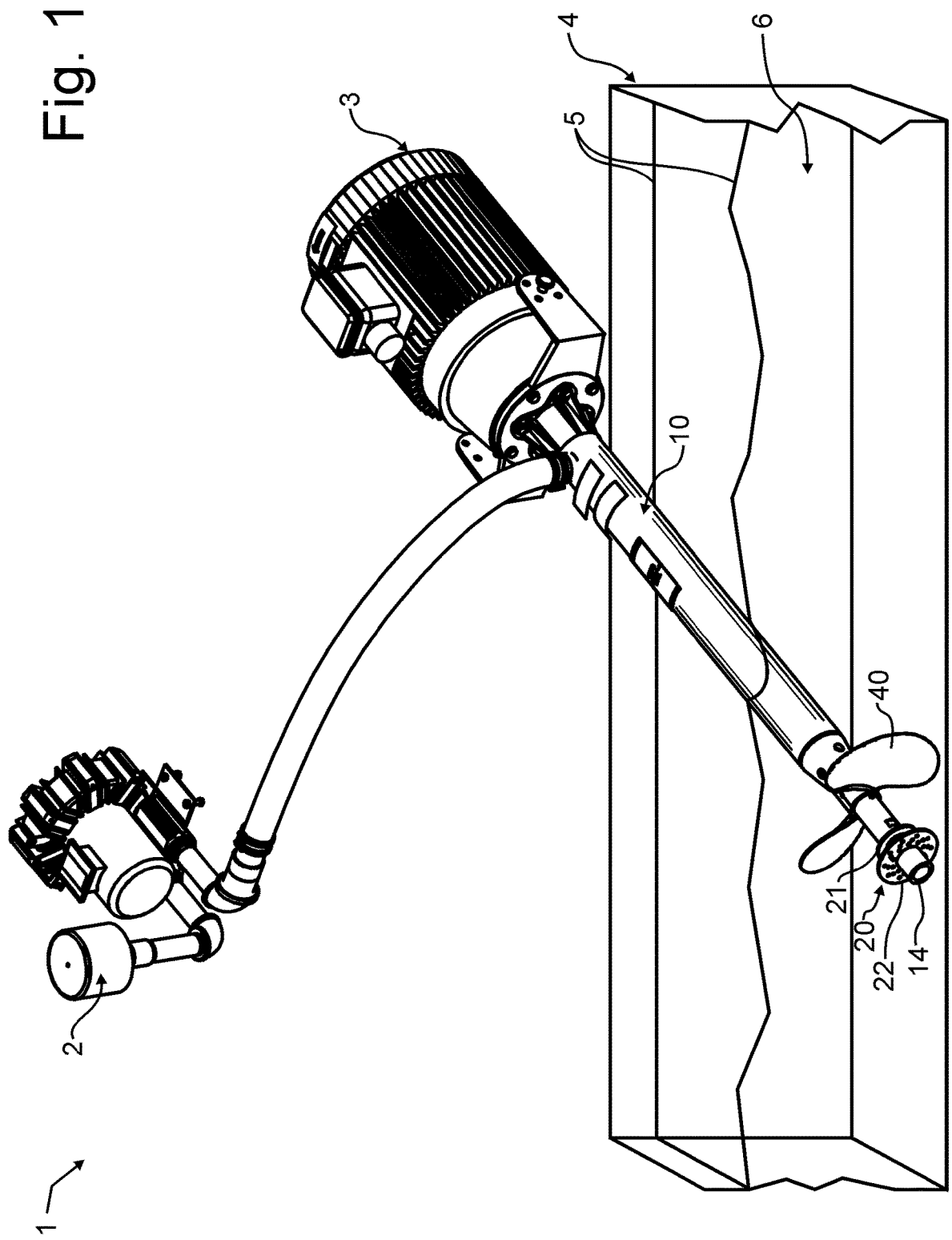
FIG. 1 illustrates a preferred embodiment apparatus for treating fluids having improved aeration efficiency and operational durability designed in accord with the teachings of the present invention from a projected view.

Manifested in the preferred embodiment, the present invention provides an apparatus for treating fluids having improved aeration efficiency and operational durability. As illustrated in FIG. 1, a preferred combination blower-assisted impeller aerator and impeller 1 is designed to be installed in a partially submerged position within a reservoir 4 filled to a water line 5 with a liquid 6 to be treated. Reservoir 4 may be of any size and geometry suitable to accommodate preferred combination blower-assisted impeller aerator and impeller 1.

A blower 2 is preferably provided outside of the liquid, and draws air from the environment and forces the air into air line 10. Ultimately, the air exits through outlet 14, which is most preferably fully submerged in the liquid 6 to be aerated or otherwise treated. A motor 3, most preferably an eight pole electric motor, in a preferred embodiment is also positioned outside of the liquid being treated. While motor 3 may in some alternative embodiments be fully submerged, as could all but the air inlet for blower 2, such submersion undesirably complicates both installation and maintenance.

Motor 3 imparts rotary motion to an impeller 40. Impeller 40 is most preferably fully submerged in liquid 6. Air line 10 is preferably tilted so as to pass from adjacent motor 3 in the air space above the liquid being treated down through the surface intermediate between motor 3 and impeller 40, and finally into the liquid to submerged impeller 40.

Preferably, when blower 2 is turned off air does not aspirate through blower 2 and air line 10 to outlet 14. Instead, the preferred combination blower-assisted impeller aerator and impeller will operate as a mixer when blower 2 is off. A baffle structure 20 configured to improve oxygenation efficiency while preventing the aforementioned aspiration when blower 2 is off preferably comprises a first baffle 21 and a second perforated baffle 22.

In some alternative embodiments, blower 2 will be removed, and replaced with an ambient air inlet. In such embodiments, baffle structure 20 will either be removed or substantially altered to permit ambient air to be aspirated through air line 10 to outlet 14 by the suction created by moving liquid passing outlet 14 under the influence of impeller 40.

Figure 2:
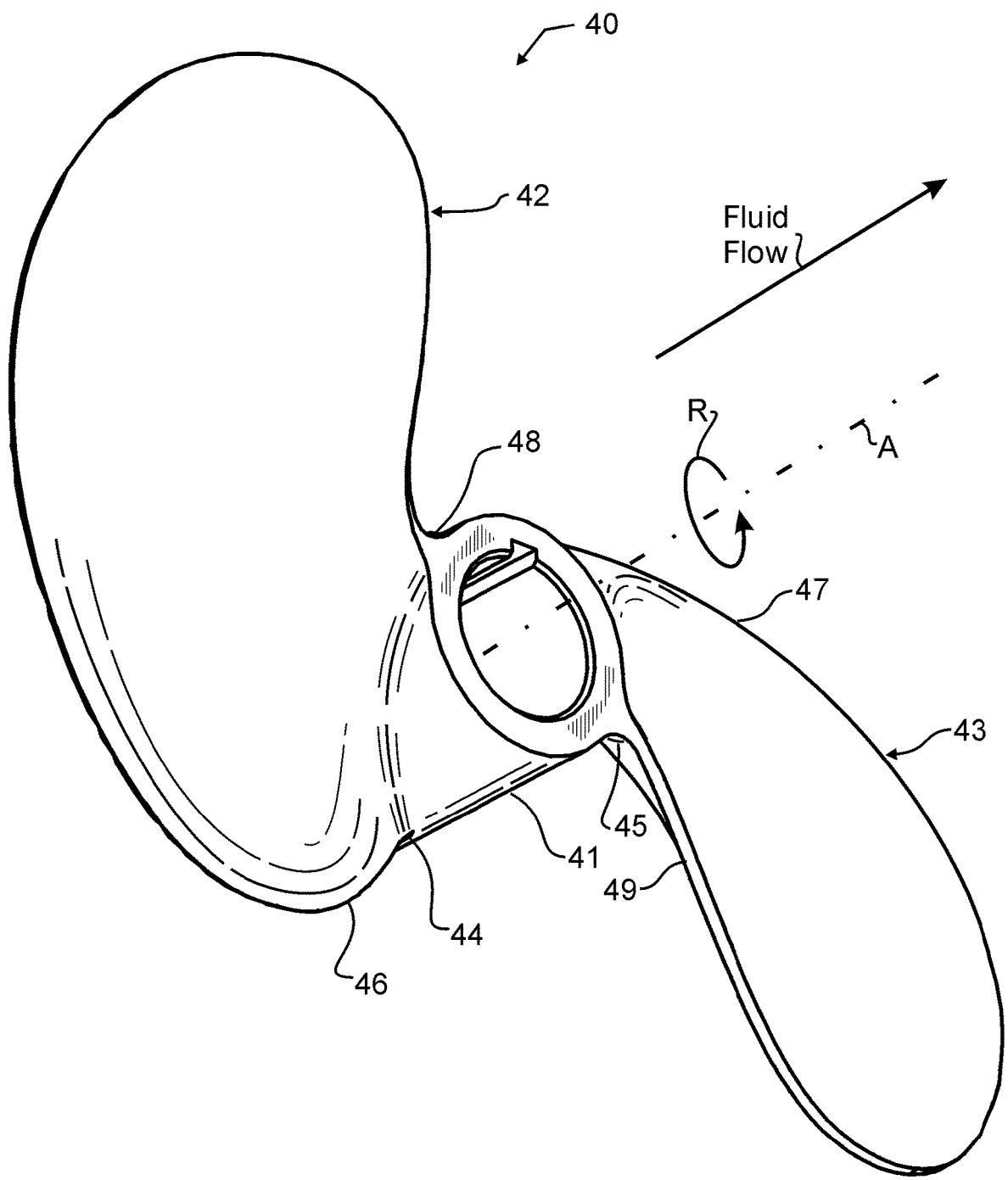
FIGS. 2-4 illustrate a preferred embodiment impeller designed in accord with the teachings of the present invention as illustrated in the combination of FIG. 1 from projected, side, and end view showing the aft or pressure generating face of the blade, respectively.
Figure 3:
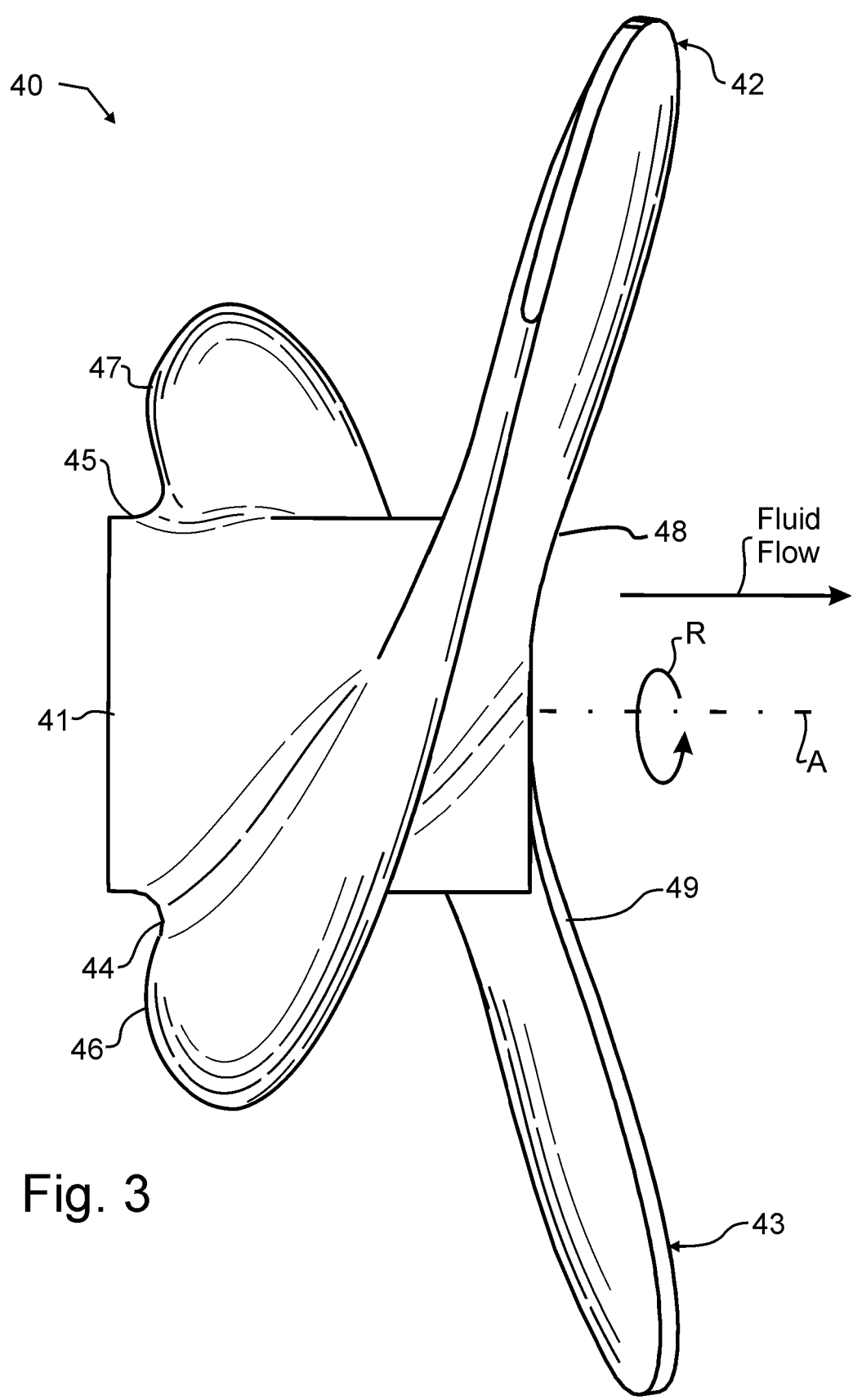
Figure 4:
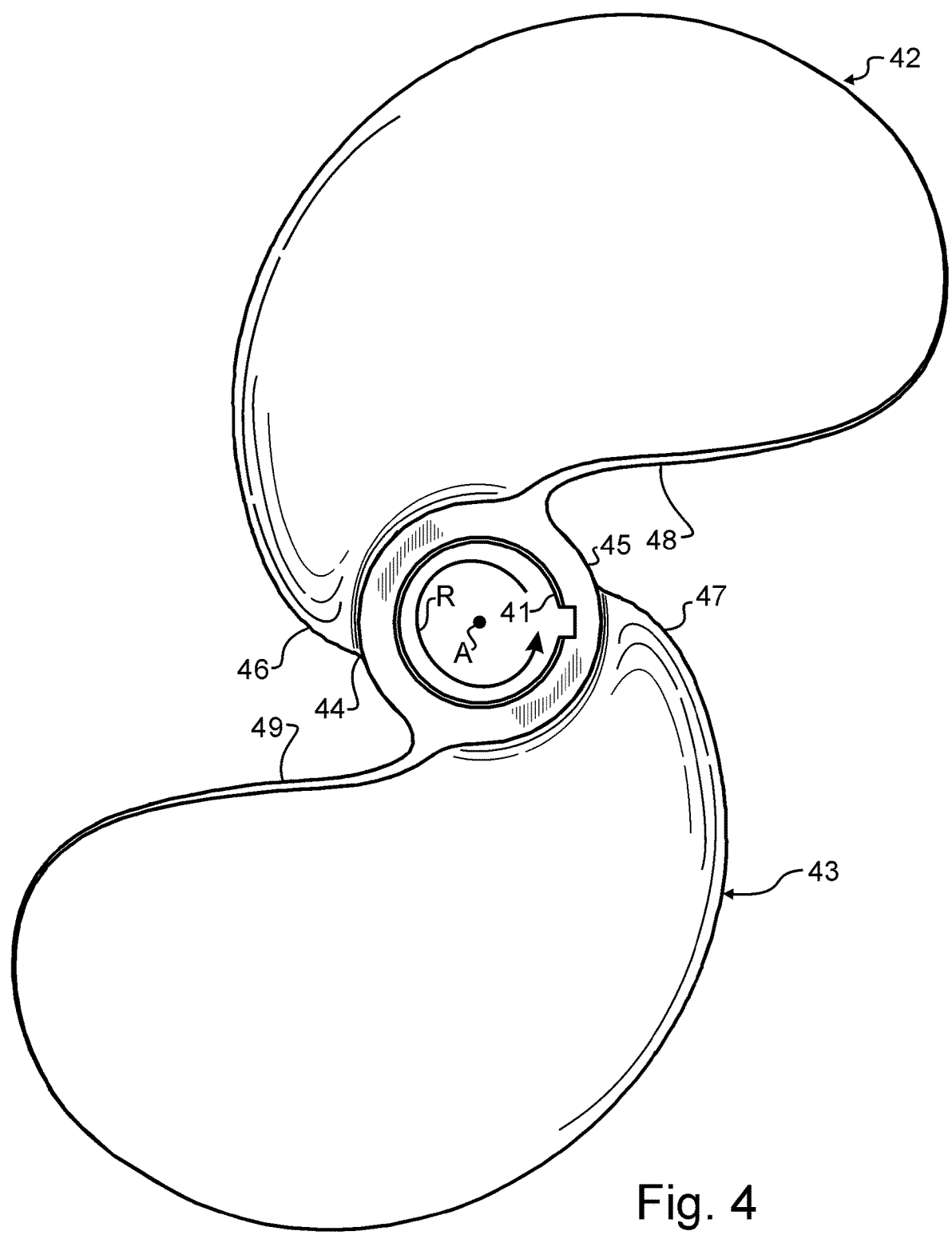
Figure 8:
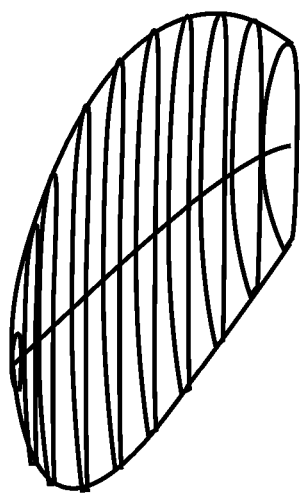
FIGS. 5-8 illustrate an exemplary specific embodiment of the impeller of FIGS. 1-4 showing the impeller in profile view, with pitch distribution, by transverse view looking aft, and by expanded view, respectively.

Preferred embodiment impeller 40 is illustrated in greater detail in FIGS. 2-4. Hollow center hub 41 is generally cylindrical, though various other options may be incorporated therein, such as the key slot visible in FIGS. 2 and 4. The longitudinal center of hub 41 defines an axis A of rotation, the direction of rotation being designated in the figures by rotation arrow R. Hub 41 supports two blades 42, 43. Blades 42, 43 connect to hub 41 at blade roots 44, 45. Blades 42, 43 taper from blade leading edges 46, 47 to narrow and yet still rounded blade trailing edges 48, 49. Blades 42, 43 are curved and are affixed to hub 41 in a helical manner, running from near the top of hub 41 to near the bottom, thereby defining a blade pitch. Blades 42, 43 are additionally substantially skewed.

In order to accomplish the objectives described herein above, preferred embodiment anti-fouling impeller 40 will preferably be designed using the following two critical criteria: first, a pitch and skew will be used that, when rotating at the desired RPM, is conducive to shedding sinewy debris; second, a dimension and surface area that, when rotating at the desired RPM, maintains required mixing and oxygen transfer rates and combines with pitch and skew to function without undesirable vibration or cavitation.

In a manner similar to other known impellers used in the aeration industry, during operation the preferred embodiment impeller of FIGS. 2-4 swirls the water or other liquid to create a long cone. Air may, for exemplary purposes, be mixed into the center of the cone of water. At the intersection with blade roots 44, 45, leading edges 46, 47 present an obtuse angle approximately tangent with the immediately adjacent hub 41 surface in the direction of rotation. While not limiting the present invention to be bound by any particular theories, preferred embodiment anti-fouling impeller 40 is thought to more readily shed debris such as rags and the like owing to this obtuse angle. In some embodiments where leading edges 46, 47 are entirely tangential with hub 41, there are no surfaces upon which debris can catch, and instead the debris will slide outward away from hub 41, rather than being wrapped in blades 42, 43 or around hub 41.

Preferred embodiment impeller 40 is also thicker than other impellers of equivalent diameter. This is believed to help prevent flexing at the edges of the blade, which would change the flow pattern in the water, and which can generate unwanted vibration and noise. Alternative embodiments may be thinner if a different material with less flexing properties is used, if the pitch or tip speed are reduced, or if the performance is not otherwise sufficiently adversely affected by a thinner impeller.

The dimension and surface area of the preferred blades illustrated in FIGS. 2-4 are chosen to preferably maintain desired mixing and oxygen transfer rates when rotating at the desired rotations per minute. Preferably, the preferred blades is conducive to shedding sinewy debris, such as string or plastic bags, when rotating at the desired rotations per minute. This decreases impeller obstructions and malfunctions, reducing maintenance costs and maintaining higher performance levels.

The increased ability to maintain function even in areas with high debris content expands the range of applications for preferred embodiment anti-fouling impeller 40, making the preferred embodiment ideal for containment areas that are not pre-filtered.

FIGS. 5-8 illustrate a most preferred but also exemplary specific embodiment of impeller 40 of FIGS. 2-4 showing impeller 40 in profile view, with pitch distribution, by transverse view looking aft, and by expanded view, respectively. In association with the present text, these Figures help to illustrate one preferred embodiment impeller, though it will be understood from the text that the geometry of a preferred embodiment impeller may vary from that illustrated in FIGS. 5-8 owing to particular horsepower ratings and other design considerations.

In accord with the teachings of the present invention, a preferred motor 3 comprises an eight pole electric motor, which has an ideal unloaded rotational velocity of 900 RPM when operated on 60 Hz AC power. In alternative embodiments, gearing, electronic motor controllers, or other apparatus and techniques may be used to adjust the rotational speed of motor 3. However, such extra apparatus adds cost and can interfere with other aspects of the present invention and embodiments thereof. As a corollary thereto, desirably the tip speed of the blade, which is determined by the rotation rate and impeller diameter, will remain below approximately 1,100 inches/second. In a most preferred embodiment, the tip speed will be between 750 and 1,060 inches/second.

Figure 7:
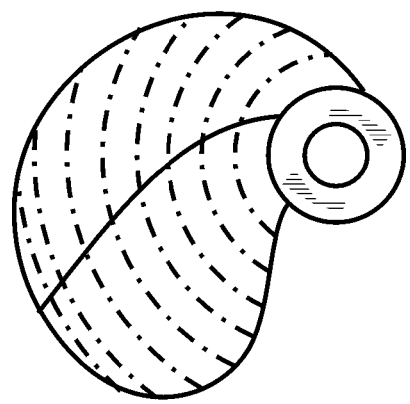
Figure 6:
Figure 5:
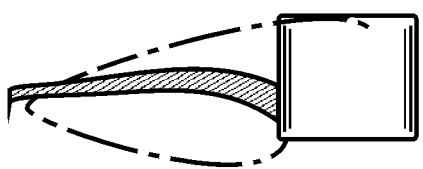

Also in accord with the teachings of the present invention, a preferred impeller 40 will have two blades, each with a skew between approximately 50 and 100 degrees. For those artisans skilled in impeller design, this will be understood to be unusually highly skewed. In a most preferred embodiment, the skew will be between 60 and 75 degrees. In addition, there will be a linear distribution from about the 50% radius to the tip, such as illustrated in FIG. 7. Nevertheless, and as evident from preferably when viewed along the axis of rotation A, in the preferred embodiment the blades do not overlap, and the gap between blades generally increases with an increase in radius from the hub. Preferred embodiment impeller 40 will additionally have no rake.

A preferred embodiment impeller 40 will additionally have an EAR (Expanded blade Area Ratio) within the range of 0.4-1.0. In a most preferred embodiment, the EAR will be between 0.47 and 0.55.

In some embodiments, an impeller 40 will also preferably have a $P_{mean}/D$ below 0.9, where $P_{mean}$ is the cord/radius integrated pitch and D is diameter. In a most preferred embodiment, the $P_{mean}/D$ will be between 0.59 and 0.87.

In some embodiments, an impeller 40 will also have a progressive pitch distribution from A leading edge to trailing edge.

In some embodiments, this progressive pitch distribution may also be based on radius, where from 50% radius and out is constant, while from 50% radius to the hub is reduced.

In some embodiments, an impeller 40 will also have a low drag, pressure equalized foil shape, commonly referred to as a wake-adapted propeller design. While there a wide variety of known foil shapes that may be suitable for various applications, one exemplary embodiment is known as a NACA 16 with an a=0.8 mean line camber distribution. One exemplary article discussing NACA 16 hydrofoils is entitled "Designing for Cavitation-Free Operation on Hydrofoils with NACA 16-Series Sections by Alan C. Connoly, J. Aircraft, November-December 1966, pp. 598-605, the teachings which are incorporated herein by reference.

From the foregoing figures and description, several additional features and options become more apparent. Preferred embodiment impeller 40 may be manufactured from a variety of materials, including metals, resins and plastics, ceramics or cementitious materials, or even laminations, combinations or composites of the above. Nevertheless, for most applications metals may be preferable given the high forces, and the metals will preferably be intrinsically corrosion resistant, such as is the case with stainless steel.

While aeration apparatuses are the focus of the present invention, preferred embodiment impeller 40 may also be used with other units that operate with the same or similar conditions and objectives as aeration units, such as mixers and related apparatus.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

I claim:

1. In combination, a blower-assisted aerator, an impeller, and a liquid reservoir containing a liquid, said blower-assisted aerator having: an eight-pole electric motor rotating said impeller fully submerged within said liquid at a blade tip speed less than 1,100 inches per second; an air-line having an air-line outlet submerged in said liquid and distal to said motor and an air-line inlet relatively more adjacent to said motor than said air-line outlet; and a blower having a blower air inlet and an air outlet, said blower forcing air from said blower inlet into said air-line inlet and through said air-line to said air-line outlet; said impeller having: a hub coupled to said electric motor and defining an axis of rotation; and two blades extending radially from said hub, each one of said two blades having a pressure equalized foil shape absent of rake, a leading edge extending from said hub tangentially, an impeller Expanded Area Ratio (EAR) between 0.47 and 0.55, a radius integrated pitch to diameter ratio ($P_{mean}$/D) between 0.59 and 0.87, a progressive pitch distribution based on radius where from 50% radius and out is constant and from 50% radius to the hub is reduced, and a skew of between 60 and 75 degrees with a linear distribution from about the 50% radius to a blade tip.

2. The combination blower-assisted aerator, impeller, and liquid reservoir of claim 1, wherein said liquid comprises municipal sewage.

3. The combination blower-assisted aerator, impeller, and liquid reservoir of claim 1, wherein said liquid comprises industrial process water.

4. The combination blower-assisted aerator, impeller, and liquid reservoir of claim 1, wherein said liquid comprises industrial waste water.

5. The combination blower-assisted aerator, impeller, and liquid reservoir of claim 1, wherein said liquid comprises aquiculture water.

* * * * *